United States Patent [19]

Mutch

[11] Patent Number: 5,054,281

[45] Date of Patent: Oct. 8, 1991

[54] GAS TURBINE ENGINE COMPARTMENT VENT SYSTEM

[75] Inventor: Henry Mutch, Chula Vista, Calif.

[73] Assignee: Rohr Industries, Inc., Chula Vista, Calif.

[21] Appl. No.: 411,643

[22] Filed: Sep. 25, 1989

[51] Int. Cl.$^5$ .............................................. F02C 7/12
[52] U.S. Cl. ................................ 60/39.83; 60/39.07; 138/39
[58] Field of Search ................ 60/39.83, 39.07, 753; 138/39

[56] References Cited

U.S. PATENT DOCUMENTS

| | | | |
|---|---|---|---|
| 2,884,956 | 5/1959 | Perlin | 138/39 |
| 3,381,713 | 5/1968 | Jacobsen | 138/39 |
| 3,981,142 | 9/1976 | Irwin | 60/39.65 |
| 4,063,847 | 12/1977 | Simmons | 415/200 |
| 4,773,212 | 9/1988 | Griffin et al. | 60/39.02 |

Primary Examiner—Louis J. Casaregola
Assistant Examiner—Laleh Jalali
Attorney, Agent, or Firm—Patrick J. Schlesinger; Frank D. Gilliam

[57] ABSTRACT

A system for selectively venting cool bypass duct air into selected locations between a gas turbine engine and the engine shroud. The venting system is useful in a turbine engine having a core engine surrounded by an engine casing and nacelle, with a fan at the inlet directing air flow into the bypass duct between core engine and engine casing. The venting system basically comprises tubes inserted in holes in the engine shroud which separates the bypass duct from the engine compartment. Often sensors, electronic components or the like are advantageously located in the engine compartment. However, elevated temperatures in the engine compartment often damages or degrades those components. The vent tubes are positioned so as to direct cool air onto those components. A large number of vents may be provided in the shroud as manufactured, each plugged at manufacture, with only those opened which are needed for a specific engine with specifically located heat sensitive components.

6 Claims, 2 Drawing Sheets

GAS TURBINE ENGINE COMPARTMENT VENT SYSTEM

BACKGROUND OF THE INVENTION

This invention relates in general to cooling heat sensitive gas turbine engine components and, more specifically, to an improved system for directing cooling engine bypass air against such heat sensitive components.

Ducted fan jet engines for aircraft applications have come into widespread use. Such engines include a core engine within a streamlined shroud, a stage of fan blades mounted upstream of the engine and driven thereby, and a nacelle surrounding the fan blades and shroud and spaced from the shroud to provide a bypass duct between nacelle and shroud through which compressed air is forced by the fan blades.

The engine produced considerable heat, so that the engine compartment volume between engine and shroud is at significantly elevated temperature. Since the exterior shape of the engine and the interior shape of the streamlined shroud are quite different, there is a considerable volume in the engine compartment which could be used to house various sensors and electronic components making more efficient use of the overall engine and nacelle volume and reducing overall size. Unfortunately, many of these components are heat sensitive, being severely damaged or degraded at the engine compartment temperatures. While some efforts have been made to run cooling lines to components in the engine compartment, these add weight and complexity and cannot accommodate components added after engine manufacture, as the engine evolves and is modified.

Thus, there is a continuing need for improvements in cooling components in the engine compartment and to accommodate moved or added components therein.

SUMMARY OF THE INVENTION

The above-noted problems, and others, are overcome by the installation of a plurality of vent tubes in the engine shroud at the time the shroud is manufactured. Open vents are placed at selected locations to direct cool bypass duct air onto components which are to be mounted within the engine compartment. Additional plugged vents are provided at selected locations to provide the capability to cool additional components which may be later added, simply by unplugging the vents.

Vents are generally simple short tubes which are bonded or otherwise secured in holes formed in the shroud. Vents may be conveniently secured in holes in commonly used honeycomb shroud walls by forming, such as by drilling, a slightly oversize hole in the shroud wall at the selected location, inserting the vent tube and filling the space therebetween with a suitable adhesive potting compound. A radial flange is preferably provided around the vent tube at a selected location to abut the wall surface and aid in properly positioning the tube during installation. Narrow, low, ribs may be provided on the exterior of the vent tubes to embed in the potting compound during installation and help hold the tubes in place.

Deflectors may be secured to the inner ends of selected tubes to help direct cool air in a desired direction. The inner ends of selected tubes could be bent to similarly direct air flow.

Extra vent tubes installed to prepare for possible future needs may be originally plugged in any suitable manner. For example, they may be filled with potting material which would be drilled out when the tube is needed for cooling, or plugs could be threaded in to the tubes, caps could be soldered on, etc.

BRIEF DESCRIPTION OF THE DRAWING

Details of the invention, and of a preferred embodiment thereof, will be further understood upon reference to the drawing, wherein.

DETAILED DESCRIPTION OF A PREFERRED EMBODIMENT

Figure 1:
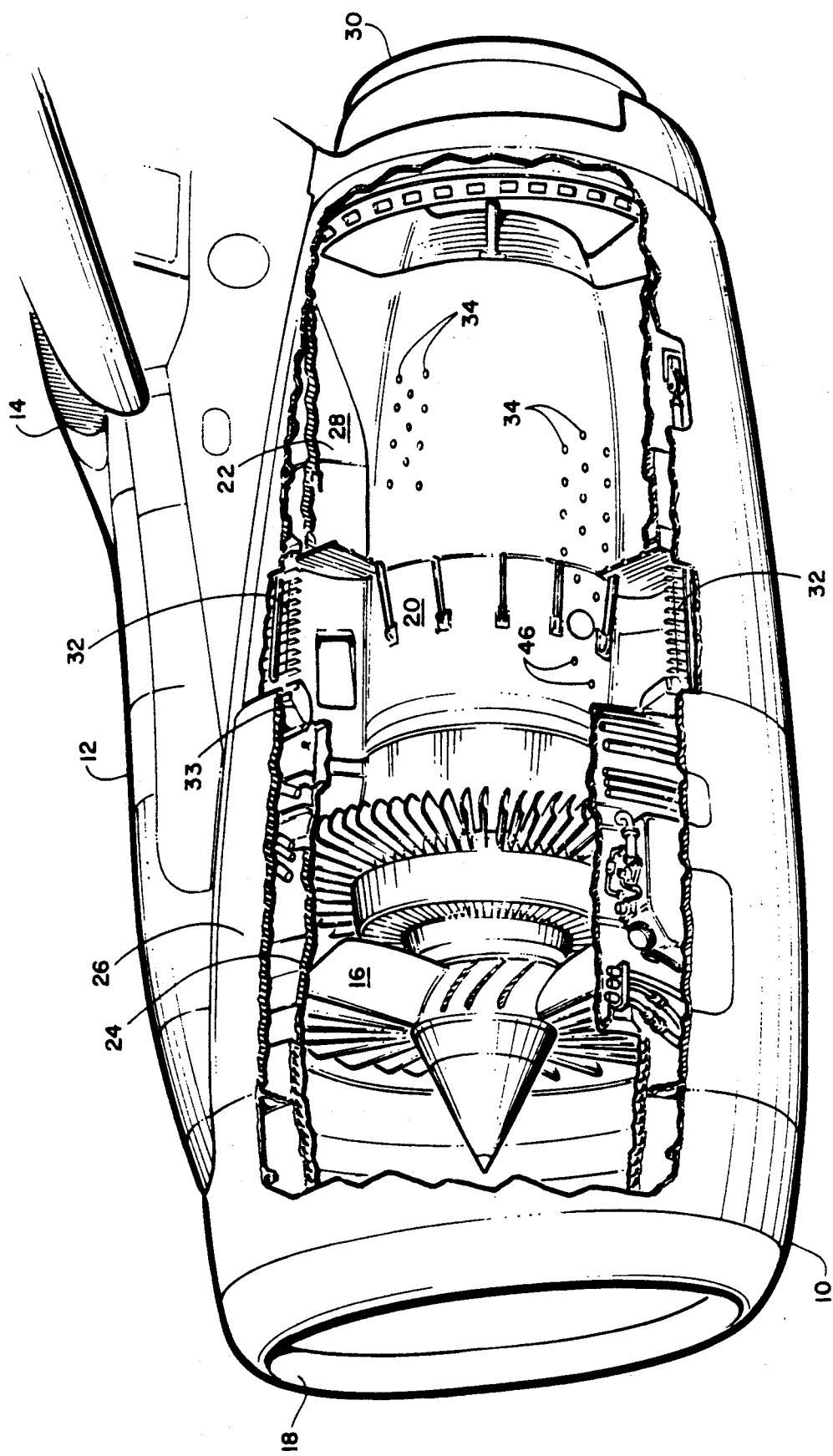
FIG. 1 is a schematic perspective view of fan jet engine, partially cut away to show the improvement of this invention.

Referring now to FIG. 1, there is seen a conventional gas turbine engine 10 of the fan type, mounted by a pylon 12 on an aircraft wing 14. A fan 16 located just within engine inlet 18 is diven by a core engine within engine inner shroud 20. Shroud 20 is ordinarily formed from two approximately "C" shaped halves with edge extensions 22 which extend to the inner wall of engine casing 24. An annular space lies between shroud 20 and the core engine.

An engine casing 24 within nacelle 26 forms part of the outer wall of a bypass duct 28 between casing 24 and core 20 into and through which fan 16 forces a flow of compressed air. In normal engine operation, the compressed air flows through bypass duct 28 and out engine outlet 30, adding to engine thrust. Thrust reversers 32, including turning vane cascades and torque ring mounting assembly 33, are provided to reverse engine thrust during landing.

A plurality of vent tubes 34 are inserted through the wall of shroud 2 at selected locations to allow pressurized cool air from bypass duct 28 to enter the space between shroud 20 and the engine within shroud 20 to cool components located therein.

Figure 2:
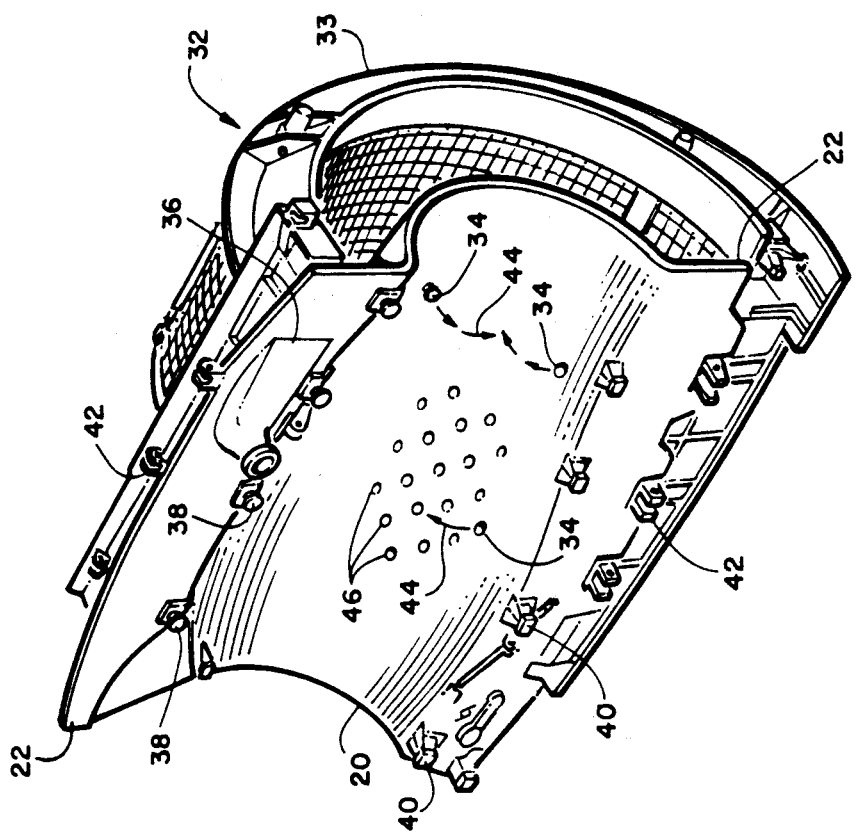
FIG. 2 is a schematic perspective view of one half of an engine shroud showing typical vent tubes.

The left hand half of a typical shroud 20, vent tubes 34 and nearby portions of the thrust reverser assembly 32 are shown in greater detail in FIG. 2. A variety of components and fittings are typically mounted on or inside the shroud, which when assembled surrounds but is spaced from a conventional engine (not shown). Typical components and fittings include a precooler duct 36, upper and lower bumpers 38 and 40, respectively, various latches 42 for fastening the shroud together and to other structures, etc.

Vents 34 are selectively located and designed to direct cool air from the bypass duct immediately outside shroud 20 toward components (not shown) within shroud 20, as indicated by air flow arrows 44. As discussed above, a number of plugged vents 46 may be provided in shroud 20 in areas where it may be, in the future, desirable to add heat-sensitive components between engine and shroud. Those plugged vents 46 can later be converted to active cooling vents 34 by unplugging them.

Figure 4:
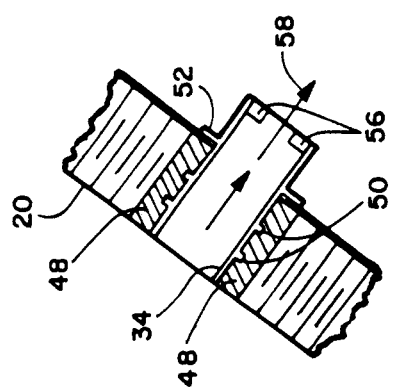
FIG. 4 is a detail axial section view through another embodiment of an installed vent tube.
Figure 3:
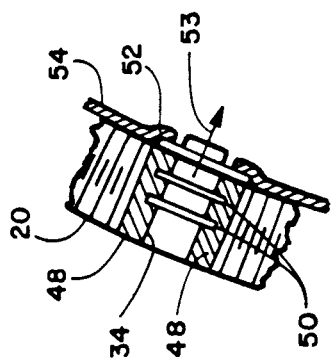
FIG. 3 is a schematic detail axial section view through a typical installed vent tube.
Figure 5:
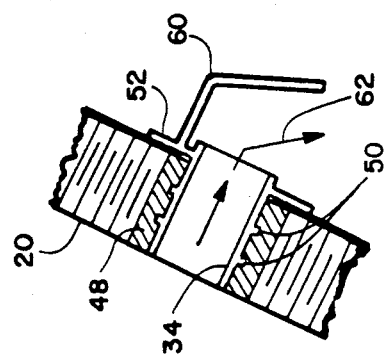
FIG. 5 is a detail axial section view through a further embodiment of an installed vent tube.

Details of several different typical active vents 34 are shown in FIGS. 3-5, each of which is a schematic axial section view through a vent. While shroud 20 may be formed from any suitable material, generally light weight, high strength materials having appreciable thicknesses, such as panels having a honeycomb core bounded by face sheets are used.

As seen in FIG. 3, at least some of vent tubes 34 may be straight tubes extending slightly beyond the internal surface of shroud 20. In order to securely fasten vent tubes 34 to a honeycomb-type shroud, it is preferred that the holes through the shroud have a diameter somewhat greater than the outside diameter of the corresponding tubes, with the space therebetween filled with a conventional potting material 48, such as a synthetic resin. One or more thin, low, ribs 50 are preferably provided on tube 34 to aid in securing the tube to the potting material. A flange 52 having a diameter greater than that of the hole through shroud 20 is preferably provided adjacent one end of vent tube 34 to aid in positioning the tube at the proper location during installation. Cool air flow through vent tube 20 is indicated by arrow 53. If desired, a surface sheet or coating 54 may be placed on the interior surface of shroud 48 in an overlapping relationship with flange 52 to help seal around the flange and help hold the flange in place.

Another embodiment of vent tube 34 is illustrated in axial section in FIG. 4. Here, each tube 34 extends into the space within shroud 20 and has a restricted outlet orifice 56 of selected diameter to direct a limited cool air stream at a particular location. If greater air flow becomes necessary at a later time, orifice 56 can be drilled out to a greater diameter to provide greater air flow. If desired, the portion of tube 34 extending beyond shroud 20 could be bent or curved to direct air flow in a particular desired direction. Air flow direction here is indicated by arrow 58.

An embodiment including means to deflect entering cool air flow in a selected direction is illustrated in axial section in FIG. 5. Here vent tube 34 itself is relatively short, but has a somewhat larger flange 52 to which a generally "L"-shaped extension 60 is secured. Extension 60 extends into the path of cool air exiting tube 34, deflecting it in the direction indicated by arrow 62.

Figure 6:
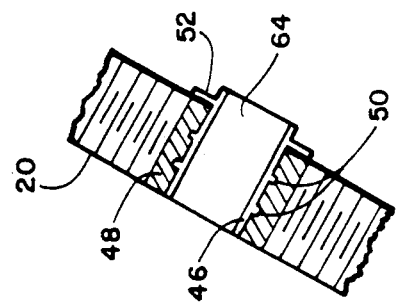
FIG. 6 is a detail axial section view through a plugged vent tube available for future opening.

A plugged vent tube 46 adapted to be pre-positioned for possible future use is illustrated in axial section in FIG. 6. Each vent tube 46, otherwise the same as the vent tubes 34 described above, is filled with a material, such a resin potting compound 64 and is installed in shroud 20 in the same manner as the vent tubes described above. Typically, such plugged vent tubes 46 would be installed adjacent to presently empty regions between the inner wall of shroud 20 and the outer wall of the engine. Later, if it becomes desirable to install a heat sensitive component at that location, the potting material may be easily drilled out, allowing cool air then to flow through the tube into cooling contact with the new component. Of course, air flow can be prevented until needed by; other means, such as by soldered or threaded cap over the vent tube, a plug threaded into the tube, etc.

While certain specific materials, sizes and arrangements were described in conjunction with the above description of preferred embodiments, those can be varied, where suitable, with similar results.

I claim:

1. In a gas turbine engine of the type having a core engine, a shroud surrounding the core engine, a tubular outer nacelle defining an annular bypass duct therebetween and a fan disposed in the nacelle inlet for directing compressed air flow into and through said bypass duct, said shroud spaced from said engine sufficiently to provide space for installation of heat sensitive engine related components, the improvement comprising:

at least one vent through said shroud, selectively positioned to direct compressed fan air from said bypass duct into said space between said shroud and engine for direct impingement on at least one of said heat sensitive engine related components for cooling same;

said vent comprising an open ended tube extending through a hole in said shroud, bonded thereto, and terminating therein adjacent to said heat sensitive engine related components.

2. The improvement according to claim 1 wherein said tube includes a flange perpendicular to the tube axis, said flange adapted to lie flush with the shroud surface when said tube is bonded to said shroud.

3. The improvement according to claim 1 wherein one end of said tube extends beyond the surface of said shroud.

4. The improvement according to claim 1 wherein said tube further includes a deflector vane extending beyond and over the exit end of said vent to deflect air flow in a selected direction.

5. The improvement according to claim 1 wherein said shroud comprises a honeycomb core with continuous face sheets and said vent comprises a tube having a flange adapted to contact one face sheet when inserted in a hole through said shroud having a diameter greater than the diameter of said vent, the space between the vent outside wall and shroud hole inside wall being filled with a potting compound.

6. The improvement according to claim 5 further including at least one radial rib around said vent, located so as to extend into said potting compound.

* * * * *